United States Patent [19]

Gavigan et al.

[11] Patent Number: 5,330,587

[45] Date of Patent: Jul. 19, 1994

[54] SHAFT OF LASER NITRIDE-HARDENED SURFACE ON TITANIUM

[75] Inventors: William J. Gavigan, Nazareth, Pa.; Craig L. Snyder, Glen Gardner; Frank J. Tufano, Skillman, both of N.J.; Ronald S. Miller, Tatamy, Pa.

[73] Assignee: Ingersoll-Rand Company, Woodcliff Lake, N.J.

[21] Appl. No.: 41,078

[22] Filed: Apr. 1, 1993

Related U.S. Application Data

[62] Division of Ser. No. 843,691, Feb. 28, 1992.

[51] Int. Cl.$^5$ .................................................. C22C 14/00
[52] U.S. Cl. .................................... 148/212; 148/206; 148/525; 148/527; 428/627
[58] Field of Search ............... 148/212, 206, 525, 527; 428/627

[56] References Cited

U.S. PATENT DOCUMENTS

| | | | |
|---|---|---|---|
| 1,936,294 | 11/1933 | Egan | 148/16 |
| 1,938,566 | 12/1933 | Birkigt | 308/3 |
| 3,111,434 | 11/1963 | Takao et al. | 148/212 |
| 3,585,088 | 6/1971 | Schwuttke et al. | 148/174 |
| 3,677,832 | 7/1972 | Van Thyne et al. | 420/417 |
| 3,841,724 | 10/1974 | Calabrese | 308/241 |
| 4,059,461 | 11/1977 | Fan et al. | 437/19 |
| 4,277,320 | 7/1981 | Beguwala et al. | 204/164 |
| 4,298,629 | 11/1981 | Nozaki et al. | 427/39 |
| 4,364,969 | 12/1982 | Dearnalgy et al. | 148/525 |
| 4,434,189 | 2/1984 | Saplatynsky | 427/53.1 |
| 4,474,861 | 10/1984 | Ecer | 428/627 |
| 4,693,760 | 9/1987 | Sioshansi | 148/212 |
| 4,753,854 | 6/1988 | Gavrilov et al. | 428/627 |
| 4,895,765 | 1/1990 | Sue et al. | 428/627 |
| 4,942,059 | 7/1990 | Wilson | 428/662 |
| 5,035,957 | 7/1991 | Bartlett et al. | 428/627 |
| 5,180,448 | 1/1993 | Hyde et al. | 148/525 |
| 5,185,211 | 2/1993 | Sue et al. | 428/660 |

OTHER PUBLICATIONS

D'Anna et al Jour. Appl. Phys. 69 (Feb. 1991) 1687.
Fedirko et al Fiz. Khim. Mekh. Mater. 5 (1990) pp. 76–79 (Ukrainian).

*Primary Examiner*—Upendra Roy
*Attorney, Agent, or Firm*—John J. Selko

[57] ABSTRACT

A process for producing a crack-free, laser nitride-hardened layer on a titanium substrate, the process including preheating the substrate, melting a small area of substrate with a laser, and shrouding the melted area with a gas mixture having a maximum critical amount of nitrogen not greater than 85%. A crack-free pump shaft so hardened to Rockwell 52 C is produced.

6 Claims, 2 Drawing Sheets

SHAFT OF LASER NITRIDE-HARDENED SURFACE ON TITANIUM

This is a Divisional of application Ser. No. 07/843,691 filed Feb. 28, 1992.

BACKGROUND OF THE INVENTION

This invention relates generally to a process for producing a nitride-hardened surface on a titanium substrate, and more particularly to a process for producing a laser nitride-hardened surface that is highly resistant to cracking.

It is well known to harden a surface of a substrate of titanium by causing nitrogen atoms to be absorbed into a pool of localized molten titanium on the surface of the substrate and to thereafter solidify the molten titanium, to form nitrides in the microstructure. Typical applications require hardness values at least equal to 52 on the Rockwell C scale. One problem with prior art nitride-hardened surfaces of this hardness is that the hardened surface has a tendency to crack upon cooling.

The foregoing illustrates limitations known to exist in present nitriding processes. Thus, it is apparent that it would be advantageous to provide an alternative directed to overcoming the limitation set forth above. Accordingly, a suitable alternative is provided including features more fully disclosed hereinafter.

SUMMARY OF THE INVENTION

In one aspect of the present invention, this is accomplished by providing a process for producing a laser nitride-hardened surface on titanium comprising: providing a titanium substrate; preheating the substrate; applying a high-density energy source to the surface of the substrate to cause localized areas of melted substrate surface; scanning the energy source along the surface of the substrate to cause the localized melting to move over an area to be hardened; simultaneously shrouding the melted substrate surface in a gaseous atmosphere containing, by volume, at least 70%, but not more than 85%, nitrogen, and the balance one or more gases that do not react with molten titanium; solidifying the melted substrate to form a hardened surface layer on the substrate comprising a matrix of titanium, with TiN particles dispersed therein; and slow cooling the substrate.

In another aspect, a shaft for a fluid handling device is provided having a laser nitride-hardened layer thereon, which layer has a minimum hardness of 52 Rockwell C, and is free from cracks.

BRIEF DESCRIPTION OF THE DRAWING FIGURES

DETAILED DESCRIPTION

Figure 1:
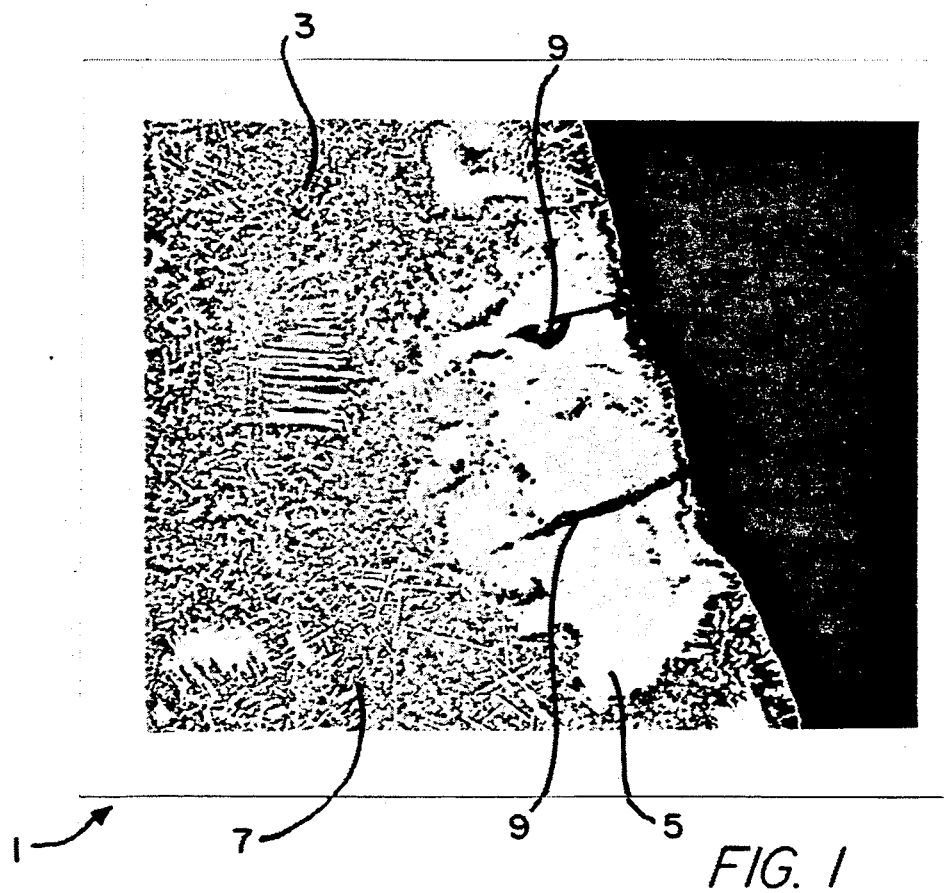
FIG. 1 is a photomicrograph, at magnification 200×, of a cross-section through a titanium substrate that has been nitride-hardened with a laser, showing a microstructure with cracks in the hardened surface.

Referring to FIG. 1, there is shown a microstructure of a laser nitride-hardened titanium substrate 1 having a base metal portion (not shown), and a hardened layer 3, forming the outer surface thereof. Hardened layer 3, comprises a multiphase layer made up of large TiN particles 5 surrounded by a dendritic structure of dispersed smaller particles of TiN 7 in a matrix of titanium. The large TiN particles are believed to be titanium nitride platelets and/or Type I alpha-stabilized particles. The large particles are caused by an excess of nitrogen around the molten titanium, during nitriding. These large particles are inherently brittle, and develop cracks 9 throughout the entire body of the particle. The hardened layer thickness is in the range of 0.005 to 0.025 inches, as measured in a line perpendicular to the outer surface of the substrate.

Figure 2:
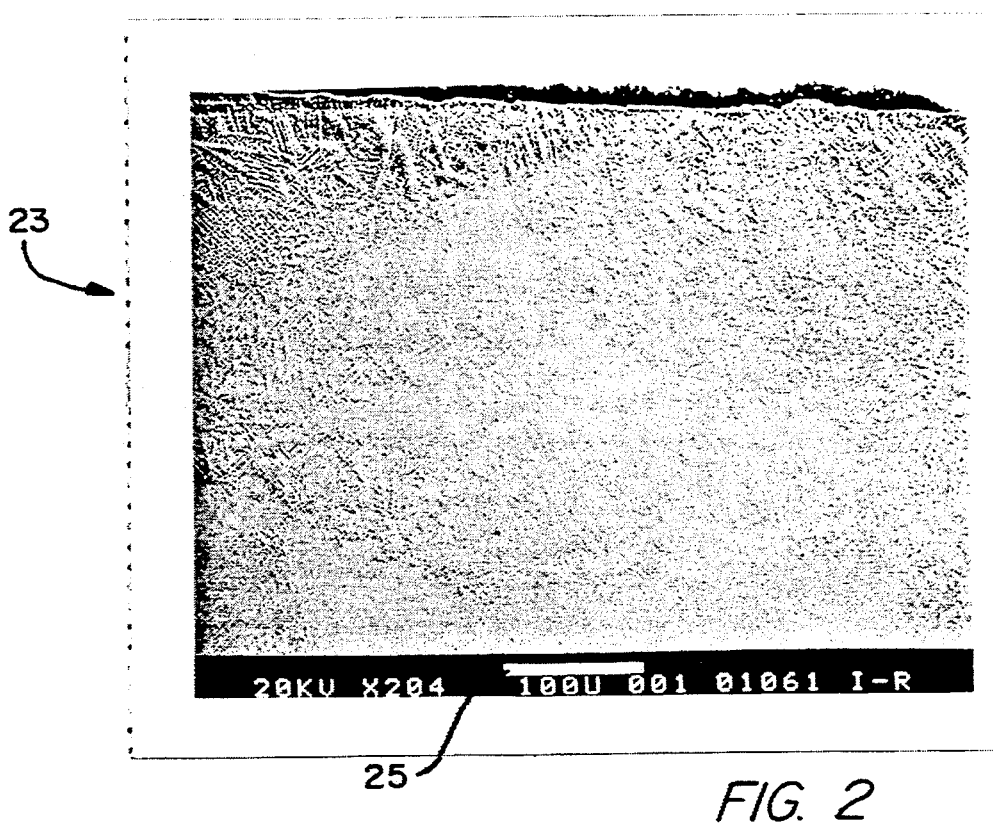
FIG. 2 is a scanning electron photomicrograph, at magnification 204×, of a cross-section through a titanium substrate that has been nitride-hardened, by the process of this invention, showing the improved microstructure of the hardened surface, that is highly resistant to cracking.

Referring to FIG. 2, there is shown the same type substrate as in FIG. 1, but treated according to the process of this invention. Base metal portion (not shown) has a hardened layer 23, forming the outer surface of the substrate. Hardened layer 23 comprises a multiphase layer made up of a dendritic structure of very fine, well dispersed TiN particles in a titanium matrix. This microstructure has the required minimum hardness of 52 Rockwell C. There is a complete absence of any cracking of the hardened layer 23. The relative size of the particles is shown by the gage length of 100 microns shown as 25.

Figure 3:
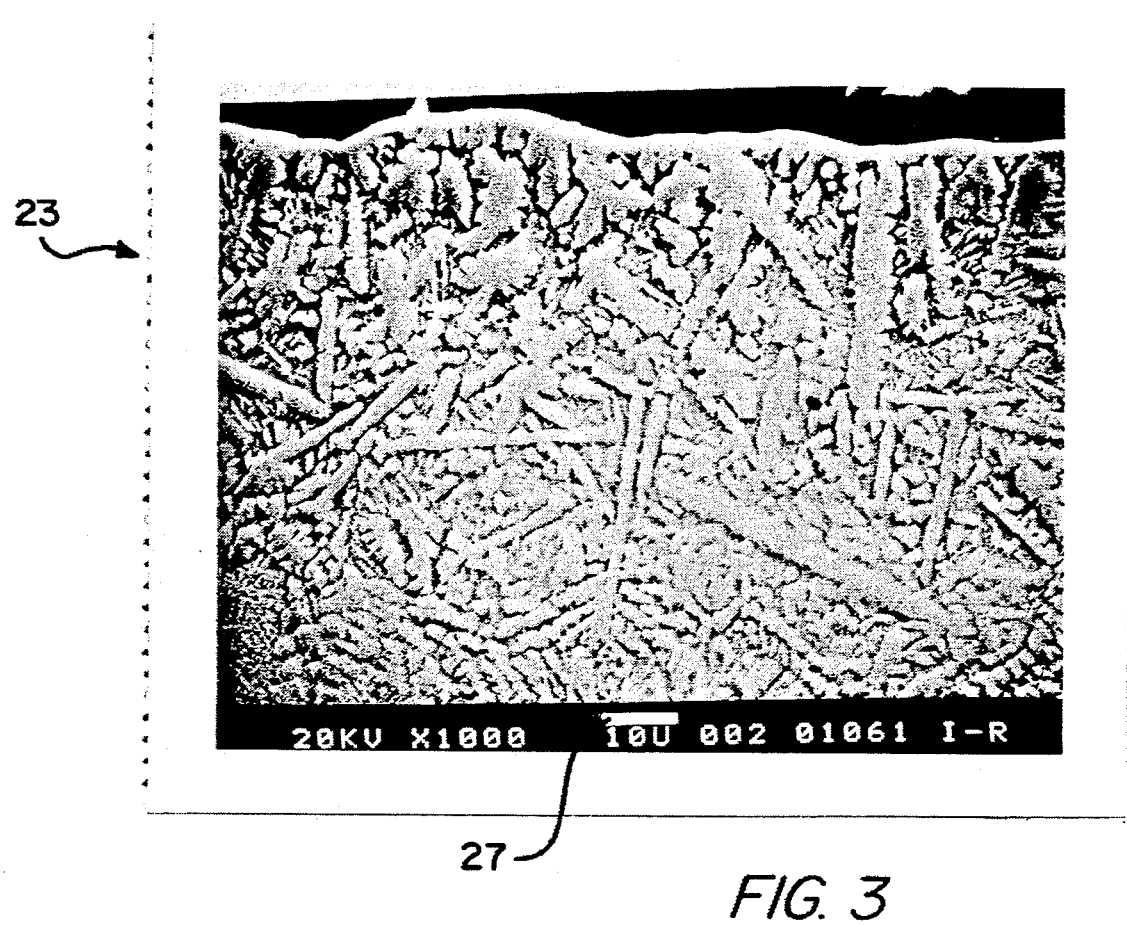
FIG. 3 is a view similar to FIG. 2 at magnification 1000×.

FIG. 3 shows the view of FIG. 2 at magnification 1000. The gage length 27 is 10 microns.

The improved microstructure is provided by the process of this invention. According to the invention, a substrate of titanium is provided in the form of an object, such as a shaft for a pump. The substrate is preheated in a furnace, in an atmosphere of air, to a temperature in the range of between 1000 and 1200 degrees F. The rate of heating is not critical but can be in the range of 200 to 400 degrees F/hour. Heating continues until the substrate is uniformly heated.

The heated substrate is next subjected to a high-density energy source which is focused on the surface of the substrate. The high-density energy source is a laser. The laser causes localized areas of the substrate surface to melt.

We prefer the following type of laser: A 5 Kw, CO2, continuous wave laser, with an output at 10.6 microns wavelength, such as provided by Spectra Physics, Inc., Model No. 975. Other lasers that can be used include a continuous wave YAG laser; and a pulsed CO2, YAG or excimer laser.

We prefer to operate the laser in the power range of 3.1 Kw to 3.6 Kw. The laser beam is focused on the surface of the substrate by a 10 inch focal length lens, to cause localized melting of the substrate.

The localized melted area is caused to move over the surface to be hardened by causing the laser to scan over the surface, by conventional means. The scanning speed ranged between 100 to 160 inches/minute preferably 130 inches/minute), in order to achieve a depth of 0.015 to 0.020 inches of hardened layer. Different speeds and power levels can result in different hardened layer thicknesses.

As the laser scans over the surface, the melted area not under the laser beam is rapidly solidified, due to the heat absorption of the unmelted substrate.

Simultaneously with the scanning, the melted substrate is shrouded in a gaseous atmosphere that has a mixture of nitrogen and a gas that is inert with respect to melted titanium, such as argon or helium. We prefer argon. This shrouding can be achieved by placing the entire substrate in the shrouding atmosphere. Alternatively, the shroud can be axially introduced around the beam emanating from the laser, and in that case, all of the localized area of melted substrate and only a portion of the remainder of the substrate will be surrounded by the shrouding gaseous atmosphere.

We have discovered a critical range of nitrogen that must be present in the shroud gas. If too little nitrogen is present, there will be insufficient nitrogen to provide a hardened layer having the minimum required hardness of Rockwell 52 C. This minimum level of nitrogen is 70% by volume. More importantly, we have discovered that there is a critical maximum level of nitrogen that must not be exceeded if cracking of the hardened layer is to be eliminated, while still providing hardness in excess of Rockwell 52 C. This critical upper level of nitrogen is 85% by volume.

This critical range of nitrogen was determined by a series of tests performed on a substrate of commercially pure titanium. Commercially pure titanium is provided under the specification ASTM-B348-90, and has an analysis of Ti-99.17%, min., balance % impurities, maximum each of: N-0.03; C-0.10; H-0.015; Fe-0.30; O-0.25.

TABLE I summarizes the test results.

TABLE I

| No. | Preheat | Laser Power | N/A Ratio | Hardness | Cracks |
| --- | --- | --- | --- | --- | --- |
| 1 | none | 3.3 KW | 100% N | +65 Rc | yes |
| 2 | 1000F | 3.3 KW | 100% N | +65 Rc | yes |
| 3 | 1200F | 3.3 KW | 100% N | +65 Rc | yes |
| 4 | 1000F | 3.3 KW | 55% N | below 50 Rc | no |
| 5 | 1000F | 3.3 KW | 71% N | above 50 Rc | no |
| 6 | 1000F | 3.3 KW | 79% N | above 50 Rc | no |
| 7 | 1000F | 3.3 KW | 84% N | above 50 Rc | minute cracks |
| 8 | 1000F | 3.3 KW | 87% N | above 50 Rc | cracked |
| *9 | 1100F | 3.3 KW | 79% N | above 50 Rc | no |
| *10 | 1100F | 3.3 KW | 79% N | above 50 Rc | no |
| *11 | 1100F | 3.3 KW | 79% N | above 50 Rc | no |
| *12 | 1100F | 3.3 KW | 79% N | above 50 Rc | no |
| *13 | 1100F | 3.3 KW | 79% N | above 50 Rc | no |
| *14 | 1100F | 3.3 KW | 79% N | above 50 Rc | no |
| *15 | 1100F | 3.3 KW | 79% N | above 50 Rc | no |
| *16 | 1100F | 3.3 KW | 79% N | above 50 Rc | no |

*production shafts.

The ratio of N/A gas was adjusted by adjusting the flow rate of each gas with a flow meter sold under the registered trademark COLE-PARMER. The flow rates of each gas was between 15 and 30 cubic feet/hour (CFH), to ensure that the shrouding gas always enveloped the melted area.

The presence or absence of cracks was determined by a dye penetrant test according to ASTM Standard Test Method For Liquid Penetrant Examination, Designation: E 165-91.

In practice, we have successfully produced shafts for use in fluid handling devices, such as pumps, using a substrate of commercially pure titanium. The shafts were 2 inches in diameter and 10 inches long, for use in a pump designated under the American Petroleum Institute specification API 610. Nitride-hardened bearing surfaces around the periphery of the shaft, for rotation of the shaft thereon, were produced with hardnesses at least 52 Rockwell C, and with no cracks. Such hardened shafts can be used in other fluid processing applications requiring titanium hardened surfaces, such as compressors.

While we have disclosed our invention in combination with commercially pure titanium, it will be apparent to those skilled in the art that the process will work with other alloys of titanium that contain other strong nitride formers in their composition. Such nitride formers include vanadium, columbium, carbon and aluminum.

Having described the invention, what is claimed is:

1. A shaft for rotation in a fluid handling device comprising:
   (a) a substrate consisting essentially of commercially pure titanium; and
   (b) a laser nitride-hardened surface layer thereon, said surface layer comprising a matrix of titanium, with TiN particles dispersed therein, said surface layer having a hardness of at least 52 Rockwell C, and being free from cooling cracks.

2. The invention of claim 1 in which said hardened layer surface is around the periphery of the shaft, to form a bearing wear area.

3. The shaft of claim 2 in which said hardened surface layer has a thickness in the range of 0.005 to 0.025 inches.

4. The shaft of claim 3 in which said titanium substrate is hardened by preheating; followed by localized laser melting and simultaneous shrouding in a gaseous atmosphere consisting essentially of, by volume, at least 70% but not more than 85% nitrogen and the balance one or more gases that do not react with molten titanium; and followed by solidifying and slow cooling of said substrate.

5. A shaft for rotation in a fluid handling device comprising:
   (a) a substrate consisting essentially of commercially pure titanium;
   (b) a laser nitride-hardened surface layer thereon, said surface layer forming a bearing wear area;
   (c) said hardened surface layer having a hardness of at least 52 Rockwell C, and being free from cracks; and
   (d) said hardened surface layer comprising a multiphase layer consisting essentially of a dendritic structure of dispersed TiN particles in a titanium matrix.

6. The shaft of claim 5 wherein said substrate includes nitride formers selected from the group consisting essentially of vanadium, columbium, carbon and aluminum.

* * * * *